United States Patent
Arai et al.

(10) Patent No.: US 10,593,475 B2
(45) Date of Patent: Mar. 17, 2020

(54) MULTI-LAYER CERAMIC CAPACITOR

(71) Applicant: Taiyo Yuden Co., Ltd., Tokyo (JP)

(72) Inventors: Norihiro Arai, Tokyo (JP); Katsuo Sakatsume, Tokyo (JP); Takeshi Nosaki, Tokyo (JP); Masumi Ishii, Tokyo (JP); Joji Ariga, Tokyo (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 0 days.

(21) Appl. No.: 16/126,242

(22) Filed: Sep. 10, 2018

(65) Prior Publication Data
US 2019/0096578 A1 Mar. 28, 2019

(30) Foreign Application Priority Data

Sep. 22, 2017 (JP) ................................ 2017-181984
May 22, 2018 (JP) ................................ 2018-097683

(51) Int. Cl.
*H01G 4/12* (2006.01)
*H01G 4/30* (2006.01)
(Continued)

(52) U.S. Cl.
CPC ......... *H01G 4/1209* (2013.01); *C04B 35/465* (2013.01); *C04B 35/486* (2013.01);
(Continued)

(58) Field of Classification Search
None
See application file for complete search history.

(56) References Cited

U.S. PATENT DOCUMENTS 5,993,895 A * 11/1999 Jang ..................... C04B 35/491
                                                                   29/25.41
2007/0135295 A1 * 6/2007 Sasabayashi ........ C01G 23/006
                                                                501/138
(Continued)

FOREIGN PATENT DOCUMENTS

JP         2009-007209 A     1/2009

*Primary Examiner* — Dion Ferguson
(74) *Attorney, Agent, or Firm* — Saliwanchik, Lloyd & Eisenschenk (57) ABSTRACT

A multi-layer ceramic capacitor includes: a ceramic body that includes a plurality of ceramic layers laminated in one axial direction and includes polycrystal having a Perovskite structure as a main phase, the Perovskite structure containing calcium and zirconium and being expressed by a general expression $ABO_3$, the polycrystal containing silicon, boron, and lithium; first and second internal electrodes alternately disposed between the ceramic layers; a first external electrode provided on an outer surface of the ceramic body and connected to the first internal electrodes; and a second external electrode provided on the outer surface of the ceramic body and connected to the second internal electrodes, the multi-layer ceramic capacitor satisfying $0.2858V+0.4371 \leq C_{Li} \leq 0.1306V+3.0391$, where $V$ (mm$^3$) represents a volume of the ceramic body, and $C_{Li}$ (atm %) represents a concentration of the lithium when a concentration of a B-site element of the main phase of the polycrystal is 100 atm %.

7 Claims, 6 Drawing Sheets

(51) Int. Cl.

| | |
|---|---|
| *H01G 4/232* | (2006.01) |
| *H01G 4/008* | (2006.01) |
| *C04B 35/486* | (2006.01) |
| *C04B 35/465* | (2006.01) |
| *C04B 35/49* | (2006.01) |
| *H01G 4/248* | (2006.01) |

(52) U.S. Cl.
CPC ............. *C04B 35/49* (2013.01); *H01G 4/008* (2013.01); *H01G 4/1227* (2013.01); *H01G 4/1236* (2013.01); *H01G 4/1245* (2013.01); *H01G 4/232* (2013.01); *H01G 4/30* (2013.01); *C04B 2235/3203* (2013.01); *C04B 2235/3208* (2013.01); *C04B 2235/3213* (2013.01); *C04B 2235/3244* (2013.01); *C04B 2235/3262* (2013.01); *C04B 2235/3409* (2013.01); *C04B 2235/3418* (2013.01); *C04B 2235/768* (2013.01); *H01G 4/248* (2013.01)

(56) References Cited

U.S. PATENT DOCUMENTS

| | | | |
|---|---|---|---|
| 2009/0046410 A1 | 2/2009 | Takeoka | |
| 2013/0201602 A1* | 8/2013 | Takeoka | B32B 18/00 |
| | | | 361/301.4 |
| 2013/0342958 A1* | 12/2013 | Suzuki | H01B 3/12 |
| | | | 361/301.4 |
| 2015/0349376 A1* | 12/2015 | Shin | H01M 10/0562 |
| | | | 429/322 |
| 2017/0346092 A1* | 11/2017 | Yada | H01M 4/0471 |
| 2018/0294520 A1* | 10/2018 | Takano | H01M 10/0525 |
| 2018/0301282 A1* | 10/2018 | Nishikawa | H01G 4/1218 |

\* cited by examiner

MULTI-LAYER CERAMIC CAPACITOR

CROSS-REFERENCE TO RELATED APPLICATIONS

This application claims the benefit under 35 U.S.C. §119 of Japanese Application Nos. 2017-181984, filed Sep. 22, 2017; and 2018-097683, filed May 22, 2018, which are hereby incorporated by reference in their entirety.

BACKGROUND

The present disclosure relates to a multi-layer ceramic capacitor that is usable in a high frequency range.

As the frequency of electronic devices increases, multi-layer ceramic capacitors used in the electronic devices are expected to have a higher Q value (quality factor) in a high frequency range. For example, Japanese Patent Application Laid-open No. 2009-7209 (hereinafter, referred to as Patent Document 1) discloses a multi-layer ceramic capacitor including copper having small specific resistance as internal electrodes and thus achieving improvement in Q value.

A sintering temperature for the multi-layer ceramic capacitor including copper as internal electrodes needs to be lower than a melting point of copper having a low melting point. For that reason, the multi-layer ceramic capacitor disclosed in Patent Document 1 includes sintering additives such as silicon, boron, and lithium, by which a liquid phase is to be formed at sintering, so as to obtain sufficient sinterability even if the sintering temperature is low.

SUMMARY

In the sintering process of the multi-layer ceramic capacitor, however, the amount of lithium, which is highly volatile, changes. For that reason, in order to sufficiently obtain an action of improving the sinterability with lithium, it is necessary for the amount of lithium to fall in an appropriate range during the whole sintering process of the multi-layer ceramic capacitor.

In view of the circumstances as described above, it is desirable to provide a multi-layer ceramic capacitor capable of ensuring high sinterability.

According to an embodiment of the present disclosure, there is provided a multi-layer ceramic capacitor including a ceramic body, first and second internal electrodes, and first and second external electrodes.

The ceramic body includes a plurality of ceramic layers laminated in one axial direction and includes polycrystal having a Perovskite structure as a main phase, the Perovskite structure containing calcium and zirconium and being expressed by a general expression $ABO_3$, the polycrystal containing silicon, boron, and lithium.

The first internal electrodes and the second internal electrodes are alternately disposed between the ceramic layers.

The first external electrode is provided on an outer surface of the ceramic body and connected to the first internal electrodes.

The second external electrode is provided on the outer surface of the ceramic body and connected to the second internal electrodes.

The multi-layer ceramic capacitor satisfies $0.2858V+0.4371 \leq C_{Li} \leq 0.1306V+3.0391$, where $V$ (mm$^3$) represents a volume of the ceramic body, and $C_{Li}$ (atm %) represents a concentration of the lithium when a concentration of a B-site element of the main phase of the polycrystal is 100 atm %.

In this configuration, the amount of lithium in the ceramic body in the sintering process can be caused to fall in an appropriate range by controlling the amount of lithium in a ceramic body to be obtained after sintering. In other words, if the multi-layer ceramic capacitor is produced such that the amount of lithium in the ceramic body has the range as described above, high sinterability of the ceramic body can be ensured.

When the concentration of the B-site element of the main phase of the polycrystal is 100 atm %, a concentration of the silicon may be 1.0 atm % or more and 6.0 atm % or less.

When the concentration of the B-site element of the main phase of the polycrystal is 100 atm %, a concentration of the boron may be 1.0 atm % or more and 6.0 atm % or less.

This configuration makes it possible to effectively provide an action of improving the sinterability of the ceramic body by using silicon and boron.

The polycrystal may further contain manganese. When the concentration of the B-site element of the main phase of the polycrystal is 100 atm %, a concentration of the manganese may be 0.5 atm % or more and 5.5 atm % or less.

In this configuration, the action of manganese improves the insulation properties of the ceramic body. Accordingly, high reliability is obtained in the multi-layer ceramic capacitor.

The first internal electrodes and the second internal electrodes may each contain copper as a main component.

In the embodiment of the present disclosure, the sinterability of the ceramic body can be ensured even if the sintering temperature is low. Accordingly, in the multi-layer ceramic capacitor, copper having a low melting point can be used as a main component of the first internal electrodes and the second internal electrodes. With this configuration, the electrical conductivity of the first and second internal electrodes increases, and thus the Q value of the multi-layer ceramic capacitor can be improved.

The volume may be 0.001 mm$^3$ or more and 5.000 mm$^3$ or less.

The volume may be 0.001 mm$^3$ or more and 0.006 mm$^3$ or less.

In those configurations, the effects of the present disclosure as described above are easily obtained.

It is possible to provide a multi-layer ceramic capacitor capable of ensuring high sinterability.

These and other objects, features and advantages of the present disclosure will become more apparent in light of the following detailed description of embodiments thereof, as illustrated in the accompanying drawings.

DETAILED DESCRIPTION OF EMBODIMENTS

Hereinafter, an embodiment of the present disclosure will be described with reference to the drawings.

In the figures, an X axis, a Y axis, and a Z axis orthogonal to one another are shown as appropriate. The X axis, the Y axis, and the Z axis are common in all figures.

1. Basic Configuration of Multi-Layer Ceramic Capacitor 10

Figure 1:
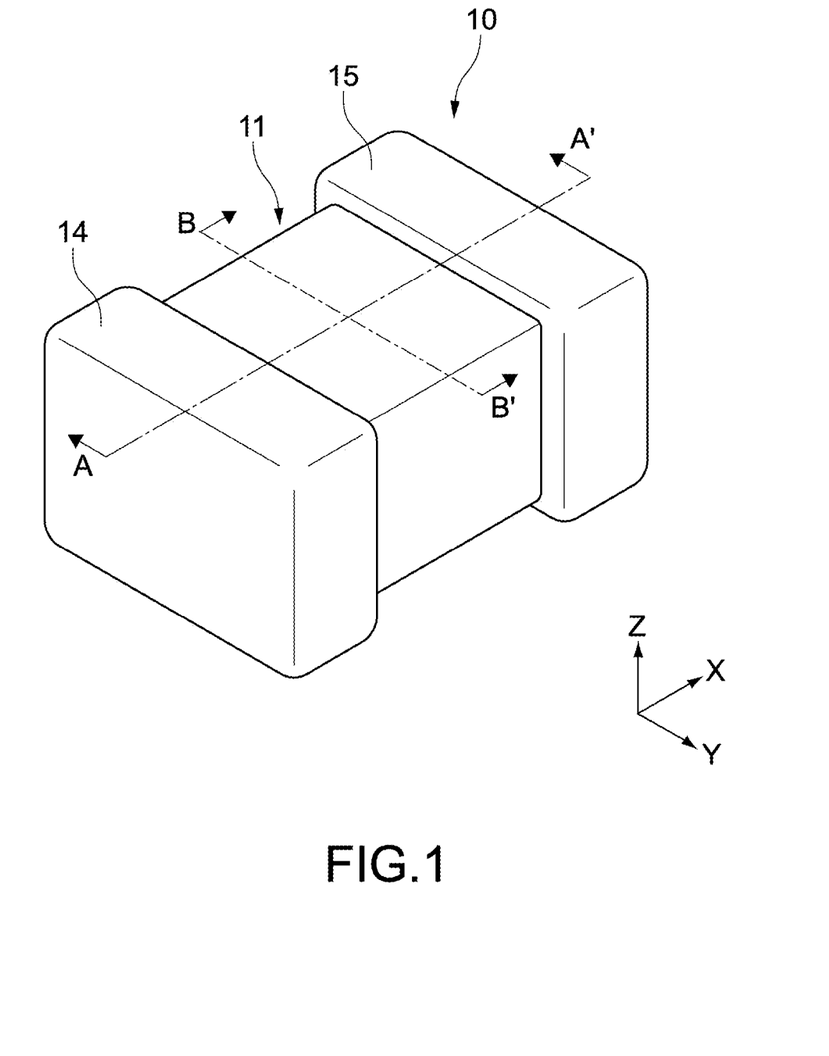
FIG. 1 is a perspective view of a multi-layer ceramic capacitor according to an embodiment of the present disclosure.
Figure 2:
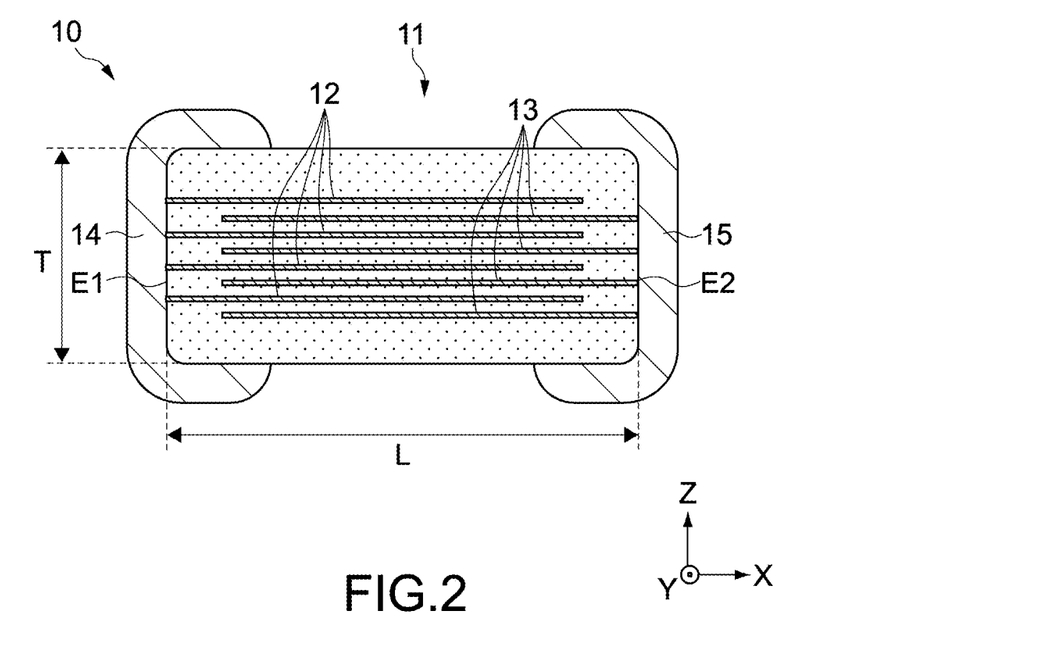
FIG. 2 is a cross-sectional view of the multi-layer ceramic capacitor taken along the A-A' line in FIG. 1.
Figure 3:
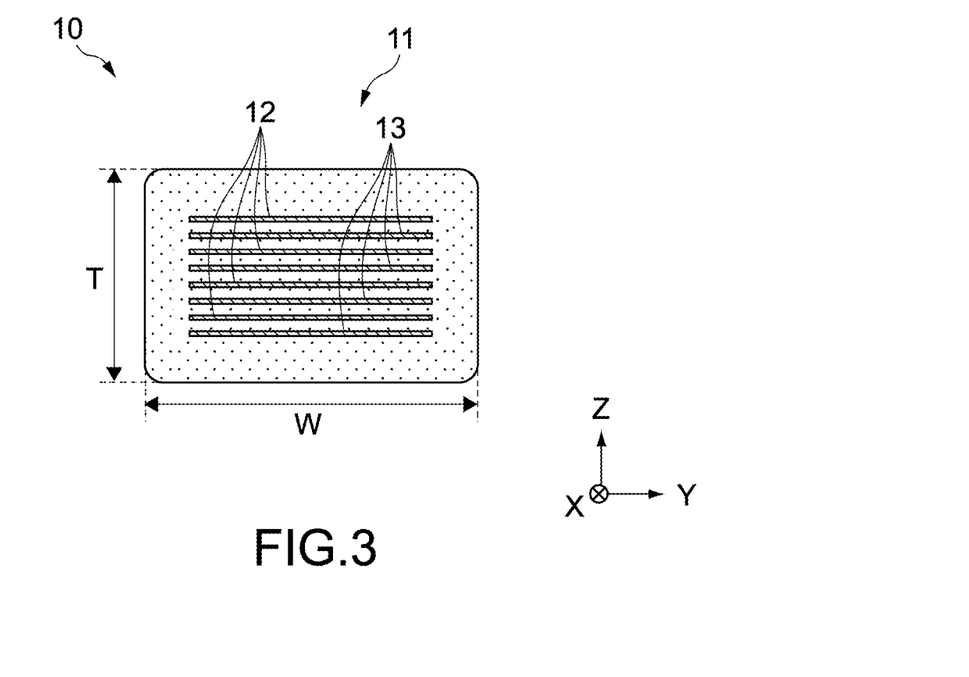
FIG. 3 is a cross-sectional view of the multi-layer ceramic capacitor taken along the B-B' line in FIG. 1.

FIGS. 1 to 3 each show a multi-layer ceramic capacitor 10 according to an embodiment of the present disclosure. FIG. 1 is a perspective view of the multi-layer ceramic capacitor 10. FIG. 2 is a cross-sectional view of the multi-layer ceramic capacitor 10 taken along the A-A' line in FIG. 1. FIG. 3 is a cross-sectional view of the multi-layer ceramic capacitor 10 taken along the B-B' line in FIG. 1.

The multi-layer ceramic capacitor 10 is configured to be suitably usable in a high frequency range of approximately 100 MHz to 2 GHz, and can be used as, for example, a high-frequency dielectric resonator or filter. Specifically, the multi-layer ceramic capacitor 10 is configured to have both a high Q value in a high frequency range and high reliability.

The multi-layer ceramic capacitor 10 includes a ceramic body 11, a first external electrode 14, and a second external electrode 15. The outer surface of the ceramic body 11 includes a first end surface E1 and a second end surface E2 facing in an X-axis direction, a first side surface and a second side surface facing in a Y-axis direction, and a first main surface and a second main surface facing in a Z-axis direction.

It should be noted that the shape of the ceramic body 11 is not limited to the above. In other words, the ceramic body 11 does not need to have the rectangular shape as shown in FIGS. 1 to 3. For example, the surfaces of the ceramic body 11 may be curved surfaces, and the ceramic body 11 may be rounded as a whole.

The first external electrode 14 covers the first end surface E1 of the ceramic body 11. The second external electrode 15 covers the second end surface E2 of the ceramic body 11. The first and second external electrodes 14 and 15 face each other in the X-axis direction while sandwiching the ceramic body 11 therebetween and function as terminals of the multi-layer ceramic capacitor 10.

The first and second external electrodes 14 and 15 respectively extend from the first and second end surfaces E1 and E2 of the ceramic body 11 to the first and second main surfaces and to the first and second side surfaces. With this configuration, both of the first and second external electrodes 14 and 15 have U-shaped cross sections parallel to an X-Z plane shown in FIG. 2 and to an X-Y plane.

It should be noted that the shape of each of the first and second external electrodes 14 and 15 is not limited to the shape shown in FIG. 1. For example, the first and second external electrodes 14 and 15 may respectively extend from the first and second end surfaces E1 and E2 of the ceramic body 11 to one of the main surfaces and may have L-shaped cross sections parallel to the X-Z plane. Further, the first and second external electrodes 14 and 15 may not extend to any of the main surfaces and side surfaces.

The first and second external electrodes 14 and 15 are each formed of a good conductor of electricity. Examples of the good conductor of electricity forming the first and second external electrodes 14 and 15 include a metal or alloy mainly containing copper (Cu), nickel (Ni), tin (Sn), palladium (Pd), platinum (Pt), silver (Ag), gold (Au), or the like.

The ceramic body 11 is formed of dielectric ceramics. The ceramic body 11 includes first internal electrodes 12 and second internal electrodes 13 covered with dielectric ceramics. The first and second internal electrodes 12 and 13 each have a sheet-like shape extending along the X-Y plane and are alternately disposed along the Z-axis direction.

In other words, the first internal electrode 12 and the second internal electrode 13 face each other in the Z-axis direction while sandwiching a ceramic layer therebetween. The first internal electrodes 12 are drawn to the first end surface E1 of the ceramic body 11 and connected to the first external electrode 14. The second internal electrodes 13 are drawn to the second end surface E2 of the ceramic body 11 and connected to the second external electrode 15.

With this condiguration as described above, when a voltage is applied between the first external electrode 14 and the second external electrode 15 in the multi-layer ceramic capacitor 10, the voltage is applied to the plurality of ceramic layers between the first internal electrodes 12 and the second internal electrodes 13. Thus, the multi-layer ceramic capacitor 10 stores charge corresponding to the voltage applied between the first external electrode 14 and the second external electrode 15.

In order to exert stable performance in a high frequency range, the multi-layer ceramic capacitor 10 is expected to have a small temperature dependence of a capacitance. For that reason, the ceramic body 11 needs to use dielectric ceramics having a small temperature dependence of a dielectric constant so as to reduce the temperature dependence of the capacitance of each ceramic layer.

Accordingly, the ceramic body 11 is formed of polycrystal having a Perovskite structure as a main phase. The Perovskite structure contains calcium (Ca) and zirconium (Zr) having a small temperature dependence of a dielectric constant and is expressed by a general expression of $ABO_3$ ("A" represents an A-site element and "B" represents a B-site element). Calcium (Ca) is an A-site element, and zirconium (Zr) is a B-site element. Specifically, the main phase of the polycrystal constituting the ceramic body 11 favorably has a composition expressed by $Ca_xZrO_3$ ($0.90 \leq x \leq 1.15$).

It should be noted that, in the main phase of the polycrystal constituting the ceramic body 11, part of the calcium (Ca) and part of zirconium (Zr) may be substituted with other elements as necessary. For example, part of the calcium (Ca) of the A-site element may be substituted with strontium (Sr). Further, part of the zirconium (Zr) of the B-site element may be substituted with titanium (Ti).

Further, the polycrystal constituting the ceramic body 11 contains silicon (Si), boron (B), and lithium (Li) as sintering additives. Those elements form a liquid phase in the sintering process of the ceramic body 11. With this configuration, the sinterability of the ceramic body 11 can be improved in the multi-layer ceramic capacitor 10.

In the sintering process of the ceramic body 11, the amount of lithium (Li), which is highly volatile, changes. For that reason, in order to sufficiently obtain an action of improving the sinterability of the ceramic body 11 with lithium (Li), it is necessary for the amount of lithium (Li) to fall in an appropriate range during the whole sintering process of the ceramic body 11.

In the multi-layer ceramic capacitor 10 according to this embodiment, the amount of lithium (Li) in the ceramic body 11 in the sintering process can be caused to fall in an appropriate range by controlling the amount of lithium (Li) in the ceramic body 11 to be obtained after sintering. This configuration of the multi-layer ceramic capacitor 10 will be described later in detail.

The amount of silicon (Si) and the amount of boron (B) in the polycrystal constituting the ceramic body 11 can be determined as appropriate. For example, it is favorable that the amount of silicon (Si) and the amount of boron (B) are determined to fall in a range where high sinterability is obtained in the ceramic body 11 and the performance of the multi-layer ceramic capacitor 10 is hardly affected.

Specifically, it is favorable that when the concentration of the B-site element of the main phase is 100 atm % in the polycrystal constituting the ceramic body 11, the concentration of silicon (Si) is 1.0 atm % or more and 6.0 atm % or less. Further, it is favorable that when the concentration of the B-site element of the main phase is 100 atm % in the polycrystal constituting the ceramic body 11, the concentration of boron (B) is 1.0 atm % or more and to 6.0 atm % or less.

The first and second internal electrodes 12 and 13 are each formed of a good conductor of electricity and function as internal electrodes of the multi-layer ceramic capacitor 10. It is favorable that the first and second internal electrodes 12 and 13 include copper (Cu) as a main component. With this configuration, the electrical conductivity of the first and second internal electrodes 12 and 13 increases in the multi-layer ceramic capacitor 10, so that equivalent series resistance (ESR) is reduced, and a high Q value is obtained.

It should be noted that the first and second internal electrodes 12 and 13 may not include copper (Cu) as a main component. In this case, the first and second internal electrodes 12 and 13 can be formed of, for example, a metal or alloy mainly containing one type or two or more types selected from the group consisting of nickel (Ni), palladium (Pd), platinum (Pt), silver (Ag), and gold (Au).

It should be noted that the basic configuration of the multi-layer ceramic capacitor 10 according to this embodiment is not limited to the configuration shown in FIGS. 1 to 3 and can be changed as appropriate. For example, the number of first and second internal electrodes 12 and 13 and the thickness of the ceramic layer can be determined as appropriate according to the size and performance expected for the multi-layer ceramic capacitor 10.

2. Method of Producing Multi-Layer Ceramic Capacitor 10

Figure 4:
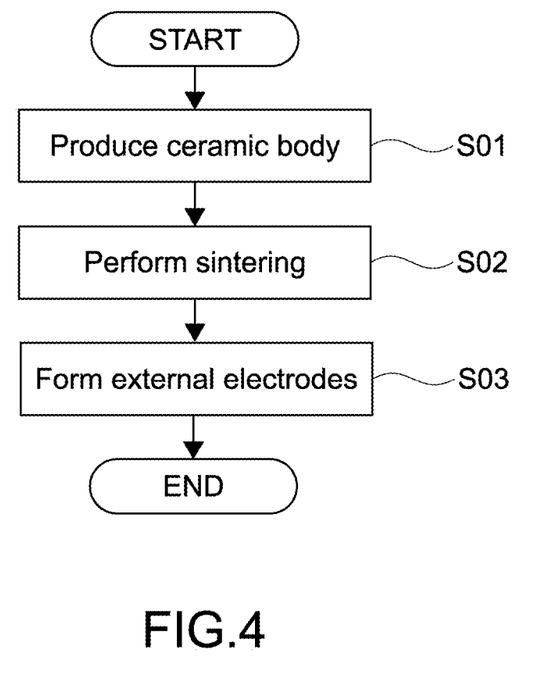
FIG. 4 is a flowchart showing a method of producing the multi-layer ceramic capacitor.
Figure 5:
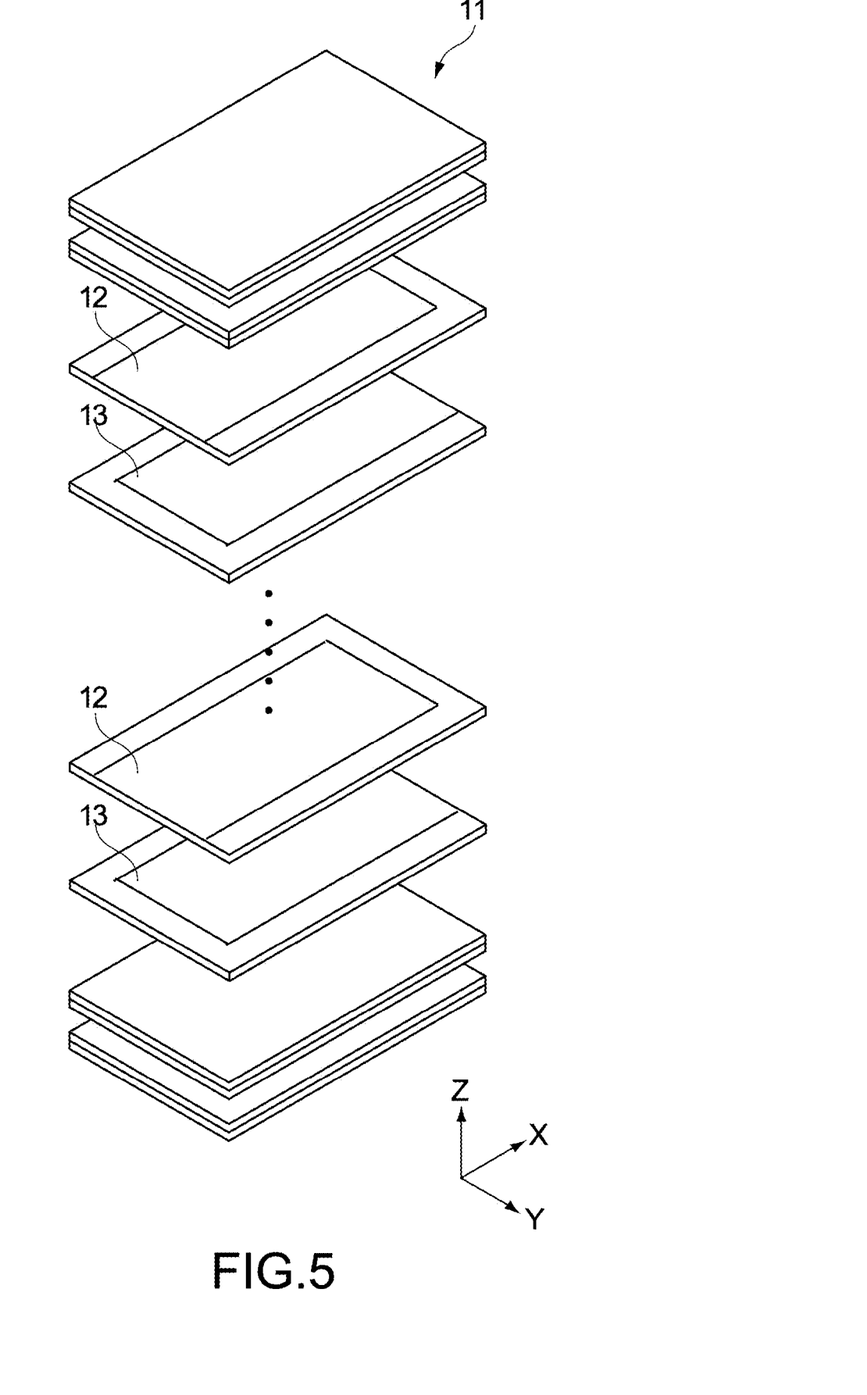
FIG. 5 is an exploded perspective view of a ceramic body in Step S01.
Figure 6:
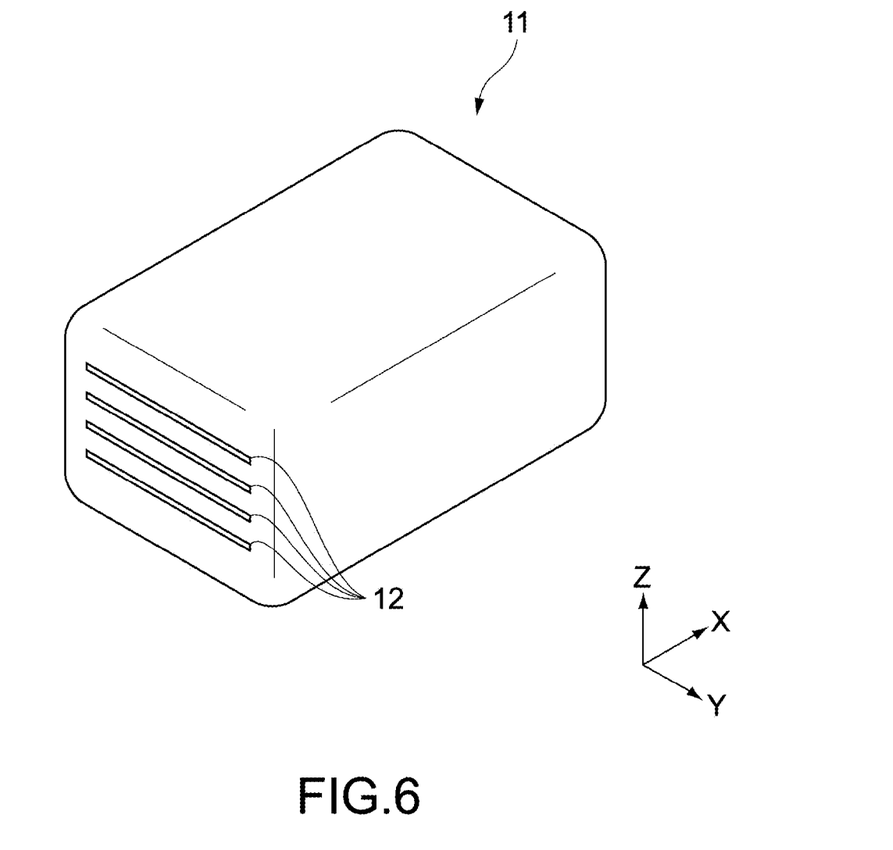
FIG. 6 is a perspective view of a ceramic body in Step S02.

FIG. 4 is a flowchart showing a method of producing the multi-layer ceramic capacitor 10. FIGS. 5 and 6 are views each showing a production process of the multi-layer ceramic capacitor 10. Hereinafter, the method of producing the multi-layer ceramic capacitor 10 will be described according to FIG. 4 with reference to FIGS. 5 and 6 as appropriate.

2.1 Step S01: Production of Ceramic Body

In Step S01, an unsintered ceramic body 11 is produced. The unsintered ceramic body 11 is obtained by laminating a plurality of ceramic sheets in the Z-axis direction as shown in FIG. 5 and pressure-bonding the ceramic sheets. Copper paste is printed on the ceramic sheets in predetermined patterns in advance, and thus the first and second internal electrodes 12 and 13 can be provided.

The ceramic sheets are unsintered dielectric green sheets obtained by forming ceramic slurry into a sheet shape. The ceramic sheets are each formed into a sheet shape by using a roll coater or a doctor blade, for example. Components of the ceramic slurry are adjusted such that the ceramic body 11 having the above-mentioned composition is obtained.

Specifically, the ceramic slurry includes calcined powder of dielectric ceramics, silicon (Si)-containing powder such as $SiO_2$, boron (B)-containing powder such as BN, and lithium (Li)-containing powder such as $Li_2CO_3$. Further, the ceramic slurry may include manganese (Mn)-containing powder such as $MnCO_3$.

2.2 Step S02: Sintering

In Step S02, the unsintered ceramic body 11 obtained in Step S01 is sintered. The ceramic body 11 is sintered, to thus obtain the ceramic body 11 shown in FIG. 6. Sintering of the ceramic body 11 can be performed in a reduction atmosphere or a low-oxygen partial pressure atmosphere, for example. Sintering conditions for the ceramic body 11 can be determined as appropriate.

For example, lithium (Li) volatilizes at the time of sintering of the ceramic body 11, and thus it is favorable to adjust the sintering conditions such that an appropriate amount of lithium (Li) is to be left in the ceramic body 11 after sintering. Further, it is favorable that the sintering temperature is lower than a melting point (1,084° C.) of copper (Cu), which is a main component of the first and second internal electrodes 12 and 13, and can be set to, for example, 950° C. Further, a sintering time can be set to, for example, two hours.

2.3 Step S03: Formation of External Electrodes

In Step S03, the first external electrode 14 and the second external electrode 15 are formed on the ceramic body 11 obtained in Step S02, to thus produce the multi-layer ceramic capacitor 10 shown in FIGS. 1 to 3. In Step S03, for example, base films, intermediate films, and surface films that constitute the first and second external electrodes 14 and 15 are formed on the first and second end surfaces E1 and E2 of the ceramic body 11. More specifically, in Step S03, an unsintered electrode material is first applied so as to cover both the first and second end surfaces E1 and E2 of the ceramic body 11. The applied unsintered electrode materials are subjected to baking in a reduction atmosphere or a low-oxygen partial pressure atmosphere, for example, to thus form base films of the first and second external electrodes 14 and 15 on the ceramic body 11.

On the base films of the first and second external electrodes 14 and 15, which are baked onto the ceramic body 11, intermediate films of the first and second external electrodes 14 and 15 are then formed, and surface films of the first and second external electrodes 14 and 15 are further formed. For the formation of the intermediate films and the surface films of the first and second external electrodes 14 and 15, for example, wet plating such as electrolytic plating can be used.

It should be noted that part of the processing in Step S03 described above may be performed before Step S02. For example, before Step S02, the unsintered electrode material may be applied to the first and second end surfaces E1 and E2 of the unsintered ceramic body 11. Accordingly, sintering of the ceramic body 11 and baking of the electrode material can be simultaneously performed in Step S02.

3. Amount of Lithium (LI) in Ceramic Body 11

In the multi-layer ceramic capacitor 10, insufficient sinterability of the ceramic body 11 causes, for example, reduction in Q value or particularly reduction in reliability of moisture resistance or the like. In order to ensure high sinterability of the ceramic body 11 with a low sintering temperature, the ceramic body 11 needs to contain an appropriate amount of silicon (Si), that of boron (B), and that of lithium (Li).

In the sintering process of the ceramic body 11, the amount of silicon (Si) and the amount of boron (B) hardly change, whereas the amount of lithium (Li), which is highly volatile, changes. Accordingly, in order to sufficiently obtain an action of lithium (Li) during the whole sintering process of the ceramic body 11, it is necessary for the amount of lithium (Li) to fall in an appropriate range.

In the multi-layer ceramic capacitor 10 according to this embodiment, the amount of lithium (Li) in the ceramic body 11 in the sintering process can be caused to fall in an appropriate range by controlling the amount of lithium (Li) in the ceramic body 11 to be obtained after sintering. With this configuration, the high sinterability of the ceramic body 11 is ensured in the multi-layer ceramic capacitor 10.

Further, in the ceramic body 11, the range of the appropriate amount of lithium (Li) after the sintering tends to change according to the volume. More specifically, it has been experimentally confirmed that as the ceramic body 11 has a larger volume, the amount of lithium (Li) necessary after the sintering tends to be larger.

Hereinafter, description will be given on an experiment for clarifying the range of the appropriate amount of lithium (Li) of the ceramic body 11 after the sintering. In this experiment, many samples of the multi-layer ceramic capacitor 10 were first produced. Those samples are different from one another in the volume of the ceramic body 11 and in the amount of lithium (Li) in the ceramic body 11.

Using a dimension L (mm) in the X-axis direction, a dimension W (mm) in the Y-axis direction, and a dimension T (mm) in the Z-axis direction, which are shown in FIGS. 2 and 3, a volume V (mm$^3$) of the ceramic body 11 can be calculated by L*W*T as a volume including the first and second internal electrodes 12 and 13. The dimensions L, W, and T of the ceramic body 11 are measured at the center portions of the ceramic body 11 in the X-, Y-, and Z-axis directions.

The amount of lithium (Li) in the ceramic body 11 was calculated as a lithium (Li) concentration $C_{Li}$ (atm %) when the concentration of the B-site element of the main phase of the polycrystal constituting the ceramic body 11 is 100 atm %. The concentration of the B-site element of the main phase of the polycrystal constituting the ceramic body 11 can be obtained as the concentration of zirconium (Zr), for example.

In other words, the lithium (Li) concentration $C_{Li}$ represents a relative concentration of lithium (Li) with the concentration of zirconium (Zr) as a reference. The concentration of zirconium (Zr) and the concentration of lithium (Li) can be quantitated by inductively coupled plasma (ICP) optical emission spectrometry.

The Q value and the moisture resistance were evaluated for each sample. In this experiment, the evaluation of the Q value and the moisture resistance leads to indirect evaluation of the sinterability of the ceramic body 11. The Q value was evaluated under the condition that the frequency is 1 GHz. The moisture resistance was evaluated under the condition that a voltage twice as large as a rated voltage is applied for 200 hours at the temperature of 85° C. and the humidity of 85%.

For the evaluation of the Q value, the samples having values 1.5 times or more as large as a standard value were determined as approved. For the evaluation of the moisture resistance, the samples having an electric resistance value of 10 MΩ or more were determined as approved.

Additionally, the samples whose Q value and moisture resistance are evaluated as approved were determined as samples of Example that have sufficient sinterability of the ceramic body 11. Meanwhile, the samples whose Q value or moisture resistance is evaluated as rejected were determined as samples of Comparative example that have insufficient sinterability of the ceramic body 11.

Figure 7:
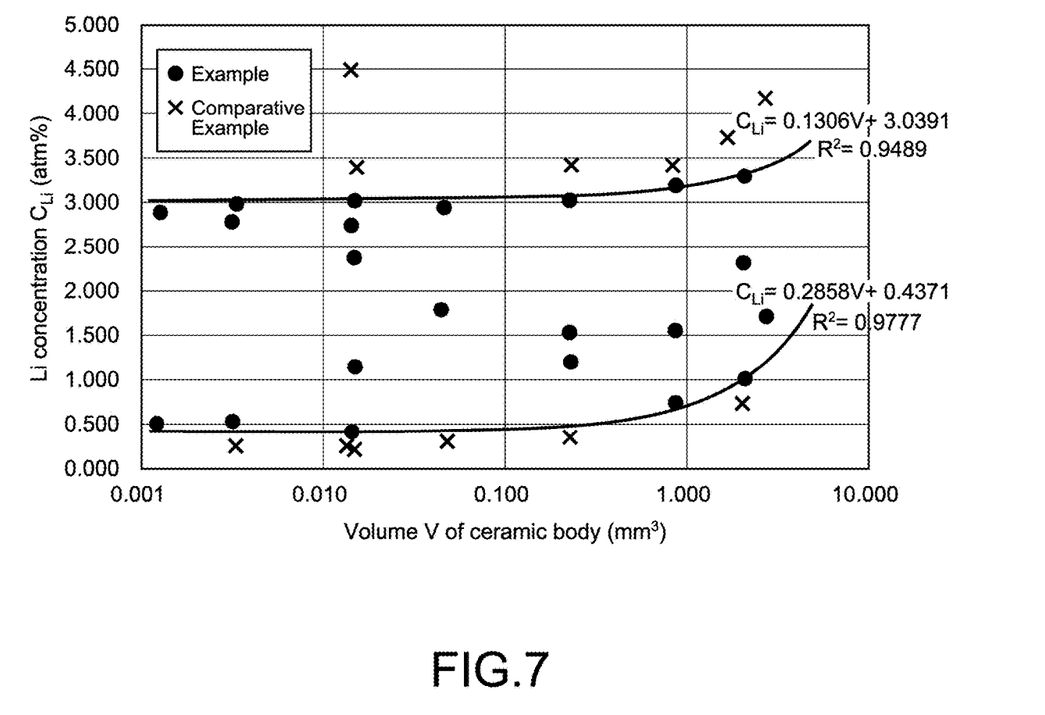
FIG. 7 is a graph showing evaluation results in Example and Comparative example.

FIG. 7 is a graph showing evaluation results of the samples. The horizontal axis of FIG. 7 represents the volume V of the ceramic body 11. The vertical axis of FIG. 7 represents the lithium (Li) concentration $C_{Li}$ when the concentration of the B-site element of the main phase of the polycrystal constituting the ceramic body 11 is 100 atm %. Further, the evaluation results of Example are plotted with circle marks and the evaluation results of Comparative example are plotted with cross marks.

It is found from FIG. 7 that the plots of Example are distributed in a specific range of the lithium (Li) concentration $C_{Li}$ and that the plots of Comparative example are distributed above and below the range of the plots of Example. Therefore, if the conditions adequate to the range where the plots of Example are distributed are employed, high sinterability of the ceramic body 11 can be ensured.

FIG. 7 shows a curve obtained by fitting the plots constituting the uppermost part of the range where the plots of Example are distributed by using the least squares method. This curve is expressed by "$C_{Li}$=0.1306V+3.0391". It should be noted that a coefficient of determination $R^2$ is 0.9489, and optimal fitting is obtained.

Further, FIG. 7 shows a curve obtained by fitting the plots constituting the lowermost part of the range where the plots of Example are distributed by using the least squares method. This curve is expressed by "$C_{Li}$=0.2858V+0.4371". It should be noted that a coefficient of determination $R^2$ is 0.9777, and optimal fitting is obtained.

Therefore, the range where the plots of Example are distributed in FIG. 7 can be expressed by the following expression.

$$0.2858V+0.4371 \leq C_{Li} \leq 0.1306V+3.0391$$

In other words, if the ceramic body 11 of the multi-layer ceramic capacitor 10 is produced so as to satisfy this expression, high sinterability is ensured. Further, controlling the sinterability of the ceramic body 11 with the above expression as a reference is more effective when the volume V of the ceramic body 11 is 0.001 mm$^3$ or more and 5.000 mm$^3$ or less, and is much more effective when the volume V of the ceramic body 11 is 0.001 mm$^3$ or more and 0.006 mm$^3$ or less.

4. Other Embodiments

Hereinabobve, the embodiment of the present disclosure has been described, but the present disclosure is not limited to the embodiment described above, and it should be appreciated that the present disclosure may be variously modified as a matter of course.

What is claimed is:
1. A multi-layer ceramic capacitor, comprising:
a ceramic body that
includes a plurality of ceramic layers laminated in one axial direction, and
includes polycrystal having a Perovskite structure as a main phase, the Perovskite structure containing cal- cium and zirconium and being expressed by a general expression $ABO_3$, the polycrystal containing silicon, boron, and lithium;

first internal electrodes and second internal electrodes that are alternately disposed between the ceramic layers;

a first external electrode that is provided on an outer surface of the ceramic body and connected to the first internal electrodes; and a second external electrode that is provided on the outer surface of the ceramic body and connected to the second internal electrodes, the multi-layer ceramic capacitor satisfying $$0.2858V+0.4371 \leq C_{Li} \leq 0.1306V+3.0391,$$

where V (mm$^3$) represents a volume of the ceramic body, and $C_{Li}$ (atm %) represents a concentration of the lithium when a concentration of a B-site element of the main phase of the polycrystal is 100 atm %.

2. The multi-layer ceramic capacitor according to claim 1, wherein when the concentration of the B-site element of the main phase of the polycrystal is 100 atm %, a concentration of the silicon is 1.0 atm % or more and 6.0 atm % or less.

3. The multi-layer ceramic capacitor according to claim 1, wherein when the concentration of the B-site element of the main phase of the polycrystal is 100 atm %, a concentration of the boron is 1.0 atm % or more and 6.0 atm % or less.

4. The multi-layer ceramic capacitor according to claim 1, wherein the polycrystal further contains manganese, and when the concentration of the B-site element of the main phase of the polycrystal is 100 atm %, a concentration of the manganese is 0.5 atm % or more and 5.5 atm % or less.

5. The multi-layer ceramic capacitor according to claim 1, wherein the first internal electrodes and the second internal electrodes each contain copper as a main component.

6. The multi-layer ceramic capacitor according to claim 1, wherein the volume is 0.001 mm$^3$ or more and 5.000 mm$^3$ or less.

7. The multi-layer ceramic capacitor according to claim 1, wherein the volume is 0.001 mm$^3$ or more and 0.006 mm$^3$ or less.

* * * * *